United States Patent
Chen et al.

(10) Patent No.: US 12,089,106 B2
(45) Date of Patent: Sep. 10, 2024

(54) ROAMING METHOD FOR WIRELESS TERMINAL AND ELECTRONIC DEVICE

(71) Applicant: Ruijie Networks Co., Ltd., Fuzhou (CN)

(72) Inventors: Jianxiang Chen, Fuzhou (CN); Lei Zheng, Fuzhou (CN)

(73) Assignee: Ruijie Networks Co., Ltd., Fuzhou (CN)

(*) Notice: Subject to any disclaimer, the term of this patent is extended or adjusted under 35 U.S.C. 154(b) by 0 days.

(21) Appl. No.: 18/615,887

(22) Filed: Mar. 25, 2024

(65) Prior Publication Data
US 2024/0267819 A1     Aug. 8, 2024

Related U.S. Application Data (63) Continuation of application No. PCT/CN2022/129494, filed on Nov. 3, 2022.

(30) Foreign Application Priority Data

Nov. 4, 2021  (CN) .......................... 202111299733.6

(51) Int. Cl.
| | |
|---|---|
| H04W 36/00 | (2009.01) |
| H04W 36/30 | (2009.01) |
| H04W 52/36 | (2009.01) |

(52) U.S. Cl.
CPC ..... *H04W 36/30* (2013.01); *H04W 36/00835* (2018.08); *H04W 36/00837* (2018.08); *H04W 52/367* (2013.01)

(58) Field of Classification Search
None
See application file for complete search history.

(56) References Cited

U.S. PATENT DOCUMENTS

| | | | |
|---|---|---|---|
| 2008/0192698 A1* | 8/2008 | Rue | H04W 52/0206 370/331 |
| 2018/0352473 A1 | 12/2018 | Gunasekara et al. | |

FOREIGN PATENT DOCUMENTS

| | | |
|---|---|---|
| CN | 101272308 A | 9/2008 |
| CN | 102883301 A | 1/2013 |

(Continued)

OTHER PUBLICATIONS

Chinese Office Action from CN 202111299733.6 dated Oct. 26, 2022.

(Continued)

*Primary Examiner* — Suhail Khan
(74) *Attorney, Agent, or Firm* — ArentFox Schiff LLP; Michael Fainberg (57) ABSTRACT

Embodiments of the present application disclose a roaming method for a wireless terminal. The method includes: detecting that first comprehensive signal quality of a first wireless terminal is lower than a first specified threshold, reducing a transmit power by a first specified value, wherein the specified packets are null packets, and sending specified packets to the first wireless terminal, so that the first wireless terminal broadcasts a probe request; sending, to neighboring APs, a scan request carrying a first identifier and a first channel accessed by the first wireless terminal, so that the neighboring APs return a scan response carrying the first identifier and third comprehensive signal quality; selecting a switch-to AP from the neighboring APs based on the first comprehensive signal quality and third comprehensive signal quality; and sending a transmit-power increasing notification carrying the first identifier and a second specified value to the switch-to AP.

18 Claims, 4 Drawing Sheets

(56) References Cited

FOREIGN PATENT DOCUMENTS

| | | |
|---|---|---|
| CN | 103686890 A | 3/2014 |
| CN | 103945434 A | 7/2014 |
| CN | 104301957 A | 1/2015 |
| CN | 105247911 A | 1/2016 |
| CN | 105657760 A | 6/2016 |
| CN | 107222897 A | 9/2017 |
| CN | 108235395 A | 6/2018 |
| CN | 111491352 A | 8/2020 |
| CN | 111935743 A | 11/2020 |
| CN | 114205756 A | 3/2022 |
| WO | 2014155044 A1 | 10/2014 |

OTHER PUBLICATIONS

Chinese Notice of Allowance from CN 202111299733.6 dated Jan. 2, 2024.
International Search Report for PCT/CN2022/129494 dated Jan. 28, 2023.

* cited by examiner

ROAMING METHOD FOR WIRELESS TERMINAL AND ELECTRONIC DEVICE

CROSS-REFERENCE TO RELATED APPLICATIONS

This application is a continuation of International Patent Application No. PCT/CN2022/129494 filed on Nov. 3, 2022, which claims priority to Chinese Patent Application No. 202111299733.6, filed on Nov. 4, 2021 and entitled "ROAMING METHOD AND APPARATUS FOR WIRELESS TERMINAL", both of which are incorporated herein by reference in their entireties.

TECHNICAL FIELD

The present application relates to the field of wireless communication technologies, and in particular, to a roaming method for a wireless terminal and an electronic device.

BACKGROUND

In a wireless local area network (English: Wireless Local Area Network, WLAN for short), a plurality of access points (English: Access Point, AP for short) need to be used to provide wireless signal coverage for an area. A wireless terminal (for example, a mobile phone, a tablet computer, or the like) accesses an AP to access the Internet and meet a service requirement. Usually, signal coverages of the plurality of APs overlap, and the AP with an optimal signal is different at different locations. With movement of the wireless terminal, a signal from the currently accessed AP is gradually weakened, and a signal from a new AP is gradually strengthened. The wireless terminal may retain optimal wireless access performance only if the wireless terminal may access an AP with an optimal signal with the movement, so as to ensure optimal user experience.

SUMMARY

Embodiments of the present application provide a roaming method and apparatus for a wireless terminal, to reduce occurrence of stickiness, so that a wireless terminal may realize fast roaming to an AP with an optimal signal with the movement.

According to an embodiment of the present application, a roaming method for a wireless terminal is provided. The method is applied to a first access point AP of APs and includes:
detecting that first comprehensive signal quality of a first wireless terminal of accessing wireless terminals is lower than a first specified threshold, reducing a transmit power by a first specified value, and sending specified packets to the first wireless terminal, so that when determining, based on the specified packets, that second comprehensive signal quality of the first AP is lower than a second specified threshold, the first wireless terminal broadcasts a probe request carrying a first identifier of the first wireless terminal;
sending, to neighboring APs, a scan request carrying the first identifier and a first channel accessed by the first wireless terminal, so that the neighboring APs switch to the first channel based on the scan request, determine third comprehensive signal quality of the first wireless terminal based on received packets that are sent by the first wireless terminal, and return a scan response carrying the first identifier and the third comprehensive signal quality;
selecting a switch-to AP for the first wireless terminal from the neighboring APs based on the first comprehensive signal quality and third comprehensive signal quality carried in scan responses that carry the first identifier; and
sending a transmit-power increasing notification carrying the first identifier and a second specified value to the switch-to AP, so that when determining that the probe request carries the first identifier, the switch-to AP increases a transmit power by the second specified value and sends a probe response to the first wireless terminal, and when determining, based on the probe response, that fourth comprehensive signal quality of the switch-to AP is higher than a third specified threshold, the first wireless terminal accesses the switch-to AP.

Specifically, the detecting that first comprehensive signal quality of a first wireless terminal of accessing wireless terminals is lower than a first specified threshold specifically includes: monitoring signal quality for packets from the accessing wireless terminals within a specified period;
calculating pieces of comprehensive signal quality of a corresponding wireless terminal based on the signal quality for the packets of the wireless terminals; and
obtaining, from the wireless terminals, a wireless terminal with comprehensive signal quality lower than the first specified threshold to obtain the first wireless terminal, and obtaining comprehensive signal quality of the first wireless terminal to obtain the first comprehensive signal quality.

Specifically, when the specified packet is a null packet, the reducing the transmit power by the first specified value, and sending specified packets to the first wireless terminal specifically includes:
constructing a null packet to be sent to the first wireless terminal; and
reducing the transmit power by the first specified value, and sending the null packet to the first wireless terminal at a specified interval.

Specifically, the selecting the switch-to AP for the first wireless terminal from the neighboring APs based on the first comprehensive signal quality and third comprehensive signal quality carried in scan responses that carry the first identifier specifically includes:
obtaining the third comprehensive signal quality carried in the scan responses that carry the first identifier;
respectively calculating differences between the obtained pieces of third comprehensive signal quality and the first comprehensive signal quality;
determining whether a largest difference of the differences exceeds a fourth specified threshold; and
when it is determined that the largest difference exceeds the fourth specified threshold, determining an AP corresponding to the largest difference as the switch-to AP for the first wireless terminal.

In an embodiment, the method further includes:
sending a response disabling notification carrying the first identifier to other APs of the neighboring APs other than the switch-to AP, so that each of the other APs are disabled from responding to the probe request when receiving the probe request.

According to an embodiment of the present application, a roaming method for a wireless terminal is provided. The method is applied to a first neighboring access point AP of neighboring APs of a first AP and includes:

receiving a scan request that is sent by the first AP and that carries a first identifier of a first wireless terminal and a first channel accessed by the first wireless terminal, where the scan request is sent by the first AP to the neighboring APs when the first AP detects that first comprehensive signal quality of the first wireless terminal of accessing wireless terminals is lower than a first specified threshold, reduces a transmit power by a first specified value, and sends specified packets to the first wireless terminal, so that when determining, based on the specified packets, that second comprehensive signal quality of the first AP is lower than a second specified threshold, the first wireless terminal broadcasts a probe request;

after switching to the first channel based on the scan request, determining third comprehensive signal quality of the first wireless terminal based on received packets that are sent by the first wireless terminal, and returning a scan response carrying the first identifier and the third comprehensive signal quality to the first AP, so that the first AP selects a switch-to AP for the first wireless terminal from the neighboring APs based on the first comprehensive signal quality and third comprehensive signal quality carried in scan responses that carry the first identifier, and sends a transmit-power increasing notification carrying the first identifier and a second specified value to the switch-to AP; and upon receiving the transmit-power increasing notification and the probe request sent by the first wireless terminal, determining that the probe request carries the first identifier, increasing a transmit power by the second specified value, and sending a probe response to the first wireless terminal, so that when determining, based on the probe response, that fourth comprehensive signal quality of the first neighboring AP is higher than a third specified threshold, the first wireless terminal accesses the first neighboring AP.

Specifically, the determining third comprehensive signal quality of the first wireless terminal based on received packets that are sent by the first wireless terminal specifically includes:

obtaining signal quality for the received packets that are sent by the first wireless terminal; and calculating the third comprehensive signal quality of the first wireless terminal based on the signal quality for the packets.

According to an embodiment of the present application, a roaming apparatus for a wireless terminal is further provided. The apparatus is applied to access points APs and includes:

A first sending module, configured to detect that first comprehensive signal quality of a first wireless terminal of accessing wireless terminals is lower than a first specified threshold, reduce a transmit power by a first specified value, and send specified packets to the first wireless terminal, so that when determining, based on the specified packets, that second comprehensive signal quality of the first AP is lower than a second specified threshold, the first wireless terminal broadcasts a probe request carrying a first identifier of the first wireless terminal;

a second sending module, configured to send, to neighboring APs, a scan request carrying the first identifier and a first channel accessed by the first wireless terminal, so that the neighboring APs switch to the first channel based on the scan request, determine third comprehensive signal quality of the first wireless terminal based on received packets that are sent by the first wireless terminal, and return a scan response carrying the first identifier and the third comprehensive signal quality;

a selection module, configured to select a switch-to AP for the first wireless terminal from the neighboring APs based on the first comprehensive signal quality and third comprehensive signal quality carried in scan responses that carry the first identifier; and a third sending module, configured to send a transmit-power increasing notification carrying the first identifier and a second specified value to the switch-to AP, so that when determining that the probe request carries the first identifier, the switch-to AP increases a transmit power by the second specified value and sends a probe response to the first wireless terminal, and when determining, based on the probe response, that fourth comprehensive signal quality of the switch-to AP is higher than a third specified threshold, the first wireless terminal accesses the switch-to AP.

Specifically, the first sending module is configured to detect that the first comprehensive signal quality of the first wireless terminal of the accessing wireless terminals is lower than the first specified threshold, and is specifically configured to:

monitor signal quality for packets from the accessing wireless terminals within a specified period;

calculate pieces of comprehensive signal quality of a corresponding wireless terminal based on the signal quality for the packets of the wireless terminals; and obtain, from the wireless terminals, a wireless terminal with comprehensive signal quality lower than the first specified threshold to obtain the first wireless terminal, and obtain comprehensive signal quality of the first wireless terminal to obtain the first comprehensive signal quality.

Specifically, when the specified packet is a null packet, the first sending module is configured to reduce the transmit power by the first specified value and send the specified packets to the first wireless terminal, and is specifically configured to:

construct a null packet to be sent to the first wireless terminal; and reduce the transmit power by the first specified value, and send the null packet to the first wireless terminal at a specified interval.

Specifically, the selection module is configured to select the switch-to AP for the first wireless terminal from the neighboring APs based on the first comprehensive signal quality and the third comprehensive signal quality carried in the scan responses that carry the first identifier, and is specifically configured to:

obtain the third comprehensive signal quality carried in the scan responses that carry the first identifier;

respectively calculate differences between the obtained pieces of third comprehensive signal quality and the first comprehensive signal quality;

determine whether a largest difference of the differences exceeds a fourth specified threshold; and when it is determined that the largest difference exceeds the fourth specified threshold, determine an AP corresponding to the largest difference as the switch-to AP for the first wireless terminal.

In an embodiment, the apparatus further includes:

a fourth sending module, configured to send a response disabling notification carrying the first identifier to other APs of the neighboring APs other than the switch-to AP, so that each of the other APs are disabled from responding to the probe request when receiving the probe request.

According to an embodiment of the present application, a roaming apparatus for a wireless terminal is provided. The method is applied to a first neighboring access point AP of neighboring APs of a first AP and includes:

a receiving module, configured to receive a scan request that is sent by the first AP and that carries a first identifier of a first wireless terminal and a first channel accessed by the first wireless terminal, where the scan request is sent by the first AP to the neighboring APs when the first AP detects that first comprehensive signal quality of the first wireless terminal of accessing wireless terminals is lower than a first specified threshold, reduces a transmit power by a first specified value, and sends specified packets to the first wireless terminal, so that when determining, based on the specified packets, that second comprehensive signal quality of the first AP is lower than a second specified threshold, the first wireless terminal broadcasts a probe request;

a processing module, configured to: after switching to the first channel based on the scan request, determine third comprehensive signal quality of the first wireless terminal based on received packets that are sent by the first wireless terminal, and return a scan response carrying the first identifier and the third comprehensive signal quality to the first AP, so that the first AP selects a switch-to AP for the first wireless terminal from the neighboring APs based on the first comprehensive signal quality and third comprehensive signal quality carried in scan responses that carry the first identifier, and sends a transmit-power increasing notification carrying the first identifier and a second specified value to the switch-to AP; and a sending module, configured to: upon receiving the transmit-power increasing notification and the probe request sent by the first wireless terminal, determine that the probe request carries the first identifier, increase a transmit power by the second specified value, and send a probe response to the first wireless terminal, so that when determining, based on the probe response, that fourth comprehensive signal quality of the first neighboring AP is higher than a third specified threshold, the first wireless terminal accesses the first neighboring AP.

Specifically, the processing module is configured to determine the third comprehensive signal quality of the first wireless terminal based on the received packets that are sent by the first wireless terminal, and is specifically configured to:

obtain signal quality for the received packets that are sent by the first wireless terminal; and calculate the third comprehensive signal quality of the first wireless terminal based on the signal quality for the packets.

According to an embodiment of the present application, an electronic device is further provided, where the electronic device includes a processor, a communication interface, a memory, and a communication bus, and the processor, the communication interface, and the memory communicate with each other through the communication bus;

the memory is configured to store a computer program; and the processor is configured to implement the foregoing method steps when executing the program stored in the memory.

According to an embodiment of the present application, a computer-readable storage medium is further provided, where the computer-readable storage medium stores a computer program, and the foregoing method steps are implemented when the computer program is executed by a processor.

The present application has the following beneficial effects.

Embodiments of the present application provide a roaming method and apparatus for a wireless terminal. It is detected that first comprehensive signal quality of a first wireless terminal of accessing wireless terminals is lower than a first specified threshold, a transmit power is reduced by a first specified value, and then specified packets are sent to the first wireless terminal, so that when determining, based on the specified packets, that second comprehensive signal quality of a first AP is lower than a second specified threshold, the first wireless terminal broadcasts a probe request carrying a first identifier. A scan request carrying the first identifier of the first wireless terminal and a first channel accessed by the first wireless terminal is sent to neighboring APs, so that the neighboring APs switch to the first channel based on the scan request, determine third comprehensive signal quality of the first wireless terminal based on received packets that are sent by the first wireless terminal, and return a scan response carrying the first identifier and the third comprehensive signal quality. A switch-to AP for the first wireless terminal is selected from the neighboring APs based on the first comprehensive signal quality and third comprehensive signal quality carried in scan responses that carry the first identifier. A transmit-power increasing notification carrying the first identifier and a second specified value is sent to the switch-to AP, so that when determining that the probe request carries the first identifier, the switch-to AP increases a transmit power by the second specified value and sends a probe response to the first wireless terminal, and when determining, based on the probe response, that fourth comprehensive signal quality of the switch-to AP is higher than a third specified threshold, the first wireless terminal accesses the switch-to AP. In this solution, after determining that the first comprehensive signal quality of the first wireless terminal is lower than the first specified threshold, on the one hand, the first AP reduces the transmit power for sending the specified packets to the first wireless terminal, so that the first wireless terminal determines to re-probe an AP and sends a probe request after detecting that the second comprehensive signal quality of the first AP is lower than the second specified threshold. On the other hand, the first AP also sends the scan request to the other neighboring APs, so that the other APs actively scan the third comprehensive signal quality of the first wireless terminal and feed back the third comprehensive signal quality to the first AP. The first AP selects the switch-to AP for the first wireless terminal, and then notifies the switch-to AP to increase the transmit power for sending the probe response to the first wireless terminal. In this way, the first wireless terminal may determine that the fourth comprehensive signal quality of the switch-to AP is higher, and access the switch-to AP, thereby realizing fast roaming from the first AP to the switch-to AP and avoiding occurrence of a stickiness problem.

BRIEF DESCRIPTION OF DRAWINGS

The accompanying drawings described herein are intended to provide a further understanding of this application, and form a part of this application. The illustrative embodiments of this application and the description thereof are intended to explain this application and do not unduly limit this application. In the accompanying drawings.

DETAILED DESCRIPTION

As described above, in an actual network environment, with the movement of a wireless terminal, the wireless terminal frequently keeps the access to a currently accessed AP although a signal from the AP is already quite weak. This is a stickiness problem of the WLAN. In addition to poor performance, the sticky wireless terminal further causes degradation of wireless access performance and user experience of another terminal accessing the AP because the sticky wireless terminal occupies a large quantity of air interface resources of the AP.

Therefore, currently, a roaming method for a wireless terminal is urgently needed to reduce occurrence of stickiness, so that a wireless terminal may realize fast roaming to an AP with an optimal signal with the movement.

To avoid occurrence of stickiness and enable a wireless terminal to realize fast roaming to an AP with an optimal signal with the movement, embodiments of the present application provide a roaming method for a wireless terminal. The method is applied to a first access point AP of APs, and the first AP has a plurality of neighboring APs. The following describes the roaming method for a wireless terminal by using each of the first AP and a first neighboring AP as a performing entity.

Figure 1:
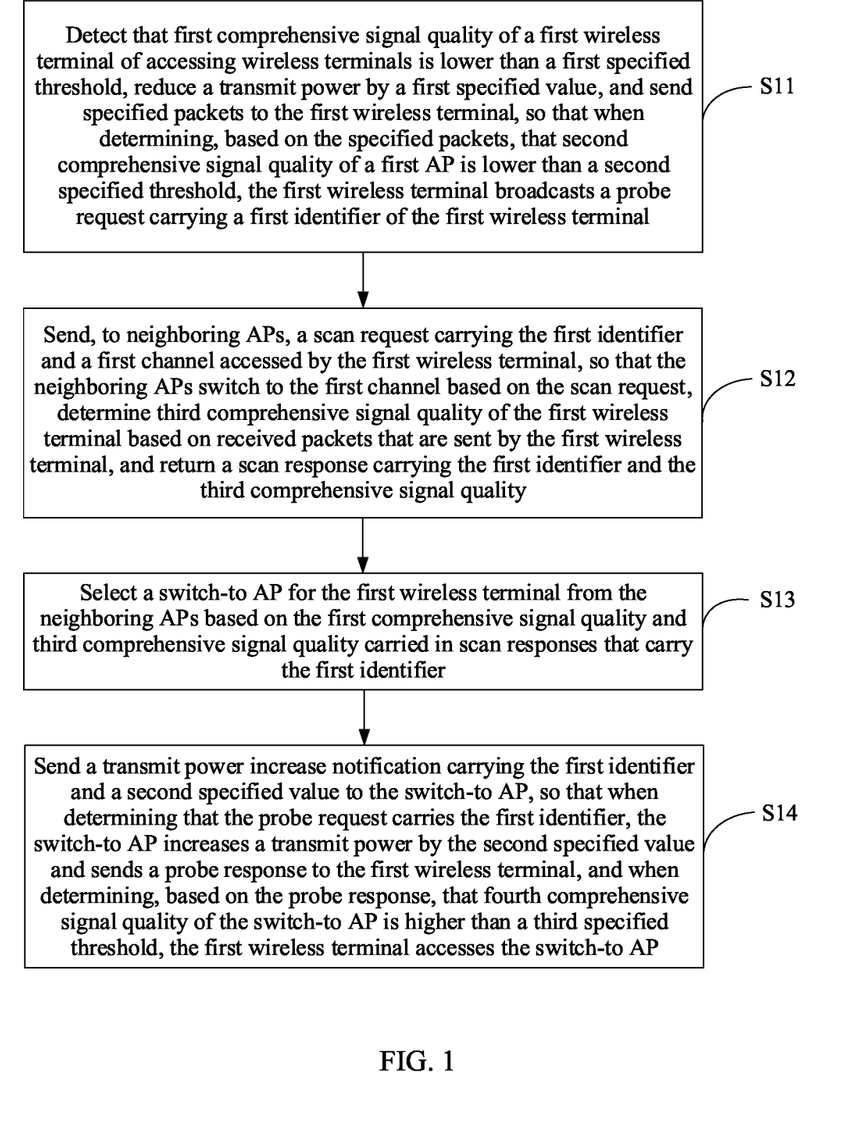
FIG. 1 is a flowchart of a roaming method for a wireless terminal performed by a first AP according to an embodiment of the present application.

First, a roaming method for a wireless terminal is described by using a first AP as a performing entity. A process of the method is shown in FIG. 1, and execution steps are as follows.

S11: It is detected that first comprehensive signal quality of a first wireless terminal of accessing wireless terminals is lower than a first specified threshold, a transmit power is reduced by a first specified value, and specified packets are sent to the first wireless terminal, so that when determining, based on the specified packets, that second comprehensive signal quality of the first AP is lower than a second specified threshold, the first wireless terminal broadcasts a probe request carrying a first identifier of the first wireless terminal.

Many wireless terminals may access the first AP. The first AP may periodically detect comprehensive signal quality of these wireless terminals. If the first AP detects that the first comprehensive signal quality of the first wireless terminal is lower than the first specified threshold, the first AP may reduce the transmit power for sending the specified packets to the first wireless terminal. The first wireless terminal determines comprehensive signal quality (which may be defined as the second comprehensive signal quality) of the first AP based on the specified packets. If the first wireless terminal determines that the second comprehensive signal quality is lower than the second specified threshold, the first wireless terminal broadcasts the probe request carrying the first identifier to perform re-probing and roaming, and accesses an AP with a better signal. Herein, the first specified threshold may be a roaming switching threshold for a wireless terminal, and may be specifically set as required. The smaller the roaming switching threshold is, the larger the first specified value may be. For example, when the roaming switching threshold is −75 dBm, the first specified value may be 10 dB or when the roaming switching threshold is −65 dBm, the first specified value may be 15 dB. This is intended to ensure that the wireless terminal may properly demodulate a received signal.

S12: A scan request carrying the first identifier and a first channel accessed by the first wireless terminal is sent to neighboring APs, so that the neighboring APs switch to the first channel based on the scan request, determine third comprehensive signal quality of the first wireless terminal based on received packets that are sent by the first wireless terminal, and return a scan response carrying the first identifier and the third comprehensive signal quality.

In addition, the first AP further sends, to the neighboring APs, a scan request carrying an identifier (which may be defined as the first identifier) of the first wireless terminal and a channel (which may be defined as the first channel) accessed by the first wireless terminal. The neighboring APs switch to the first channel based on the scan request. The neighboring APs each may be equipped with a dedicated scan module. Then a channel of the scan module is switched to the first channel. Then comprehensive signal quality (which may be defined as the third comprehensive signal quality) of the first wireless terminal is determined based on the received packets that are sent by the first wireless terminal, and the scan response carrying the first identifier and the third comprehensive signal quality is returned. The third comprehensive signal quality of the first wireless terminal that is determined by the neighboring APs may be approximately equal to comprehensive signal quality of a corresponding neighboring AP. Herein, the neighboring APs each is equipped with a dedicated scan module to scan the first wireless terminal, to accurately and quickly identify a wireless terminal with a weak signal while ensuring normal communication services, so as to reduce roaming stickiness.

It should be noted that there is no strict performing sequence between this step and S11. S11 may be performed before S12, or S12 may be performed before S11, or S11 and S12 may be performed simultaneously.

S13: A switch-to AP for the first wireless terminal is selected from the neighboring APs based on the first comprehensive signal quality and third comprehensive signal quality carried in scan responses that carry the first identifier.

The first AP usually has a plurality of neighboring APs. The first AP may select a more suitable AP from the neighboring APs as the switch-to AP for the first wireless terminal based on the first comprehensive signal quality and the third comprehensive signal quality carried in the scan responses that carry the first identifier.

S14: A transmit-power increasing notification carrying the first identifier and a second specified value is sent to the switch-to AP, so that when determining that the probe request carries the first identifier, the switch-to AP increases a transmit power by the second specified value and sends a probe response to the first wireless terminal, and when determining, based on the probe response, that fourth comprehensive signal quality of the switch-to AP is higher than a third specified threshold, the first wireless terminal accesses the switch-to AP.

The transmit-power increasing notification carrying the first identifier and the second specified value is sent to the switch-to AP. The first wireless terminal may broadcast the probe request. In this case, the probe request is sent through all channels. The switch-to AP receives the probe request, and sends the probe response to the first wireless terminal after determining that the probe request carries the first identifier and increasing the transmit power by the second specified value. The first wireless terminal determines, based on the probe response, that comprehensive signal quality (which may be defined as the fourth comprehensive signal quality) of the switch-to AP is higher than the third specified threshold, and accesses the switch-to AP. Because the comprehensive signal quality of the switch-to AP is higher, the first wireless terminal may access the switch-to AP to roam from the first AP to the switch-to AP.

The first specified value, the second specified value, the first specified threshold, the second specified threshold, and the third specified threshold may be set according to an actual requirement.

In this solution, after determining that the first comprehensive signal quality of the first wireless terminal is lower than the first specified threshold, on the one hand, the first AP reduces the transmit power for sending the specified packets to the first wireless terminal, so that the first wireless terminal determines to re-probe an AP and sends a probe request after detecting that the second comprehensive signal quality of the first AP is lower than the second specified threshold. On the other hand, the first AP also sends the scan request to the other neighboring APs, so that the other APs actively scan the third comprehensive signal quality of the first wireless terminal and feed back the third comprehensive signal quality to the first AP. The first AP selects the switch-to AP for the first wireless terminal, and then notifies the switch-to AP to increase the transmit power for sending the probe response to the first wireless terminal. In this way, the first wireless terminal may determine that the fourth comprehensive signal quality of the switch-to AP is higher, and access the switch-to AP, thereby realizing fast roaming from the first AP to the switch-to AP and avoiding occurrence of a stickiness problem.

In an embodiment, the detecting that first comprehensive signal quality of a first wireless terminal of accessing wireless terminals is lower than a first specified threshold in S11 specifically includes:
  monitoring signal quality for packets from the accessing wireless terminals within a specified period;
  calculating pieces of comprehensive signal quality of a corresponding wireless terminal based on the signal quality for the packets of the wireless terminals; and
  obtaining, from the wireless terminals, a wireless terminal with comprehensive signal quality lower than the first specified threshold to obtain the first wireless terminal, and obtaining comprehensive signal quality of the first wireless terminal to obtain the first comprehensive signal quality.

The signal quality for the packets from the accessing wireless terminals within the specified period is monitored. The packets of the wireless terminals may be packets for normal communication with the first AP, for example, a service packet or a management packet. The signal quality may be a received signal strength indication (English: Received Signal Strength Indication, RSSI for short), a signal-to-noise ratio (English: Signal-to-Noise Ratio, SNR for short), or the like. The specified period may be set according to an actual requirement. Then the comprehensive signal quality of the corresponding wireless terminal is calculated based on the signal quality for the packets of the wireless terminals. The calculation may be, but not limited to calculation of a mean or a variance. Finally, the wireless terminal with comprehensive signal quality lower than the first specified threshold is obtained from the wireless terminals to obtain the first wireless terminal, and the comprehensive signal quality of the first wireless terminal is obtained to obtain the first comprehensive signal quality.

In an embodiment, when the specified packet is a null packet, the reducing the transmit power by the first specified value, and sending specified packets to the first wireless terminal in S11 specifically includes:
  constructing a null packet to be sent to the first wireless terminal; and
  reducing the transmit power by the first specified value, and sending the null packet to the first wireless terminal at a specified interval.

The specified interval may be set according to an actual requirement. To enable the first wireless terminal to quickly determine that signal strength of the first AP is weak, the specified interval may be shortened to increase frequency of sending the null packet. In this embodiment of the present application, the null packet is a non-service null data packet. A non-service null data packet is constructed and is continually sent to a wireless terminal within a specific period of time. Power for the null packet is lower than power for normal service data by the first specified value. Within this period of time, for a response to a probe packet initiated by the first wireless terminal, a power for the response packet is also reduced. In this manner, the first wireless terminal may quickly detect that access quality of a currently accessed AP is lower than a threshold thereof, and then initiate a roaming process. In addition, because a transmit power for normal service packet data of the first wireless terminal is not reduced, actual service experience is rarely affected.

Specifically, the selecting the switch-to AP for the first wireless terminal from the neighboring APs based on the first comprehensive signal quality and third comprehensive signal quality carried in scan responses that carry the first identifier in S13 specifically includes:
  obtaining the third comprehensive signal quality carried in the scan responses that carry the first identifier;
  respectively calculating differences between the obtained pieces of third comprehensive signal quality and the first comprehensive signal quality;
  determining whether a largest difference of the differences exceeds a fourth specified threshold; and
  when it is determined that the largest difference exceeds the fourth specified threshold, determining an AP corresponding to the largest difference as the switch-to AP for the first wireless terminal.

The largest difference of the differences actually indicates optimal comprehensive signal quality. Provided that the largest difference exceeds the fourth specified threshold, it may be determined that the AP corresponding to the largest difference is the switch-to AP for the first wireless terminal.

The fourth specified threshold may be set according to an actual requirement.

In an embodiment, the method further includes:
  sending a response disabling notification carrying the first identifier to other APs of the neighboring APs other than the switch-to AP, so that each of the other APs are disabled from responding to the probe request when receiving the probe request.

To enable the first wireless terminal to quickly determine an AP for roaming, the response disabling notification carrying the first identifier may be sent to the other APs of the neighboring APs other than the switch-to AP, and the other APs are disabled from responding to the probe request when receiving the probe request. In this way, the first wireless terminal may not receive a probe response from the other neighboring APs, and therefore may more quickly determine to access the switch-to AP.

Figure 2:
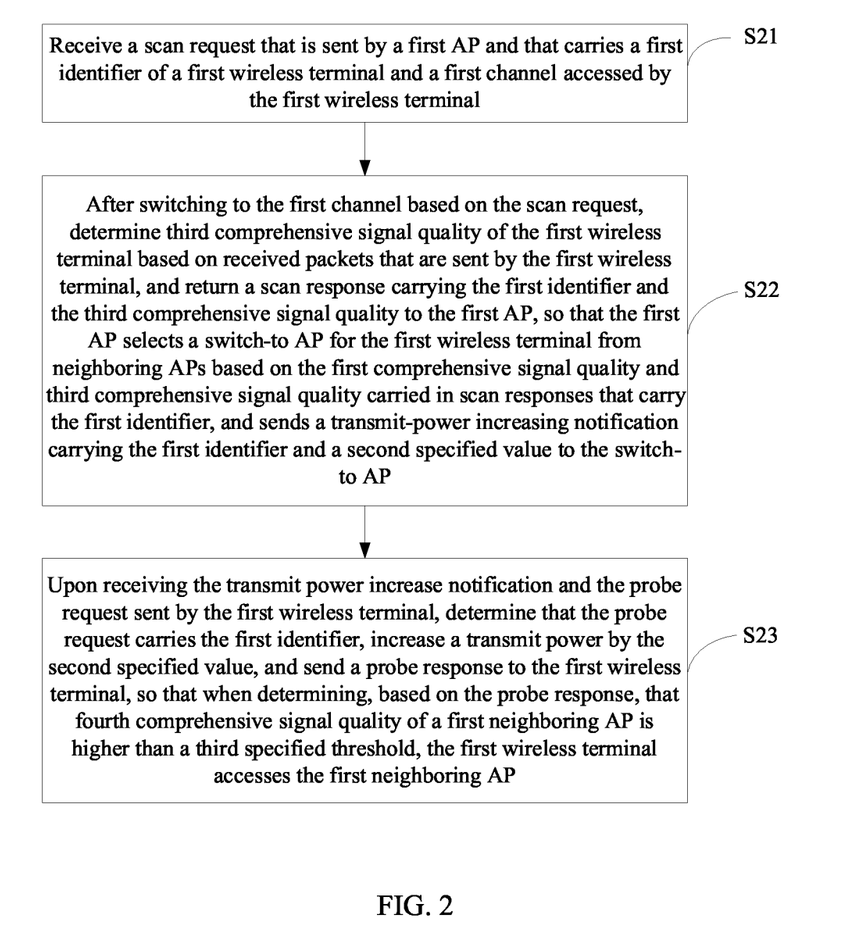
FIG. 2 is a flowchart of a roaming method for a wireless terminal performed by a first neighboring AP according to an embodiment of the present application.

The foregoing describes the roaming method for a wireless terminal by using the first AP as a performing entity. The following describes a roaming method for a wireless terminal by using a first neighboring AP of neighboring APs of a first AP as a performing entity. A process of the method is shown in FIG. 2, and performed steps are as follows.

S21: A scan request that is sent by the first AP and that carries a first identifier of a first wireless terminal and a first channel accessed by the first wireless terminal is received.

The scan request is sent by the first AP to the neighboring APs when the first AP detects that first comprehensive signal quality of the first wireless terminal of accessing wireless terminals is lower than a first specified threshold, reduces a transmit power by a first specified value, and sends specified packets to the first wireless terminal, so that when determining, based on the specified packets, that second comprehensive signal quality of the first AP is lower than a second specified threshold, the first wireless terminal broadcasts a probe request.

S22: After switching to the first channel based on the scan request, third comprehensive signal quality of the first wireless terminal is determined based on received packets that are sent by the first wireless terminal, and a scan response carrying the first identifier and the third comprehensive signal quality is returned to the first AP, so that the first AP selects a switch-to AP for the first wireless terminal from the neighboring APs based on the first comprehensive signal quality and third comprehensive signal quality carried in scan responses that carry the first identifier, and sends a transmit-power increasing notification carrying the first identifier and a second specified value to the switch-to AP.

S23: Upon receiving the transmit-power increasing notification and the probe request sent by the first wireless terminal, it is determined that the probe request carries the first identifier, a transmit power is increased by the second specified value, and a probe response is sent to the first wireless terminal, so that when determining, based on the probe response, that fourth comprehensive signal quality of the first neighboring AP is higher than a third specified threshold, the first wireless terminal accesses the first neighboring AP.

If the first neighboring AP receives the transmit-power increasing notification, it indicates that the first neighboring AP is the switch-to AP selected by the first AP for the first wireless terminal. If the first neighboring AP further receives the probe request sent by the first wireless terminal, the first neighboring AP determines that the probe request carries the first identifier, increases the transmit power by the second specified value, and sends the probe response to the first wireless terminal, to further enable the first wireless terminal to quickly determine the first neighboring AP to be accessed. The first wireless terminal determines, based on the probe response, that the fourth comprehensive signal quality of the first neighboring AP is higher than the third specified threshold, and accesses the first neighboring AP.

In this solution, after determining that the first comprehensive signal quality of the first wireless terminal is lower than the first specified threshold, the first AP reduces the transmit power for sending the specified packets to the first wireless terminal, so that the first wireless terminal determines to re-probe an AP and sends a probe request after detecting that the second comprehensive signal quality of the first AP is lower than the second specified threshold. In addition, the first AP also sends the scan request to the other neighboring APs, so that the other APs actively scan the third comprehensive signal quality of the first wireless terminal and feed back the third comprehensive signal quality to the first AP. The first AP selects the switch-to AP for the first wireless terminal, and then notifies the switch-to AP to increase the transmit power for sending the probe response to the first wireless terminal. In this way, the first wireless terminal may determine that the fourth comprehensive signal quality of the switch-to AP is higher, and access the switch-to AP, thereby realizing fast roaming from the first AP to the switch-to AP and avoiding occurrence of a stickiness problem.

Specifically, the determining third comprehensive signal quality of the first wireless terminal based on received packets that are sent by the first wireless terminal in S22 specifically includes:
  obtaining signal quality for the received packets that are sent by the first wireless terminal; and
  calculating the third comprehensive signal quality of the first wireless terminal based on the signal quality for the packets.

The packets of the first wireless terminal may be packets for normal communication with the first AP, for example, a service packet or a management packet. The signal quality may be an RSSI, an SNR, or the like. Then the comprehensive signal quality of the first wireless terminal is calculated based on the signal quality for the packets of the first wireless terminal. A calculation manner may be but is not limited to calculation of a mean or a variance.

It should be noted that the first AP and the first neighboring AP are defined for ease of description. In practical application, each AP may serve as the first AP and is also a neighboring AP of another AP. In other words, the methods shown in FIG. 1 and FIG. 2 are performed simultaneously.

Through verification in an actual scenario, signal strength of the first wireless terminal upon roaming increases from an average of −75 dBm to −65 dBm. This greatly improves connection performance of a wireless terminal in a WLAN. Stickiness time that is a period within which roaming fails, where it should be performed, decreases from more than 20 seconds without the application to less than 3 seconds.

The embodiments of the present application are applicable to all wireless terminals, to enable fast roaming in a WLAN and achieve better network experience. In a conventional WLAN, 30% of wireless terminals are usually in a sticky state. First, wireless access performance of these wireless terminals may not be guaranteed, and user experience may hardly be ensured, especially in real-time service applications such as video conferencing. In addition, a wireless terminal in a sticky state also has great impact on other users in the WLAN. Specifically, a low-rate packet occupies a sending occasion of an air interface. Consequently, sending time for the other users decreases, and performance of the entire network deteriorates. In the embodiments of the present application, quick detection for stickiness of a wireless terminal and quick guiding are implemented, so that signal strength during roaming and switching of a wireless terminal increases by more than 10 dBm, stickiness time decreases by more than 80%, and a proportion of sticky wireless terminals decreases from 30% to less than 3%. This greatly improves wireless access performance and experience of a wireless terminal in a moving state. Compared with other solutions, this better adapts to wireless terminals and achieves a higher roaming success rate.

Figure 3:
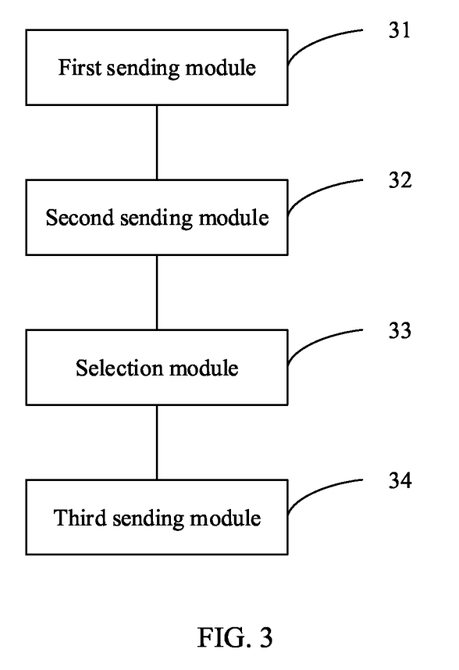
FIG. 3 is a schematic structural diagram of a roaming apparatus for a wireless terminal corresponding to FIG. 1 according to an embodiment of the present application.

Based on the same inventive concept, an embodiment of the present application provides a roaming apparatus for a wireless terminal. The apparatus corresponds to the method shown in FIG. 1, and is applied to a first AP of APs. A structure of the apparatus is shown in FIG. 3, and the apparatus includes:

a first sending module 31, configured to detect that first comprehensive signal quality of a first wireless terminal of accessing wireless terminals is lower than a first specified threshold, reduce a transmit power by a first specified value, and send specified packets to the first wireless terminal, so that when determining, based on the specified packets, that second comprehensive signal quality of the first AP is lower than a second specified threshold, the first wireless terminal broadcasts a probe request carrying a first identifier of the first wireless terminal;

a second sending module 32, configured to send, to neighboring APs, a scan request carrying the first identifier and a first channel accessed by the first wireless terminal, so that the neighboring APs switch to the first channel based on the scan request, determine third comprehensive signal quality of the first wireless terminal based on received packets that are sent by the first wireless terminal, and return a scan response carrying the first identifier and the third comprehensive signal quality;

a selection module 33, configured to select a switch-to AP for the first wireless terminal from the neighboring APs based on the first comprehensive signal quality and third comprehensive signal quality carried in scan responses that carry the first identifier; and a third sending module 34, configured to send a transmit-power increasing notification carrying the first identifier and a second specified value to the switch-to AP, so that when determining that the probe request carries the first identifier, the switch-to AP increases a transmit power by the second specified value and sends a probe response to the first wireless terminal, and when determining, based on the probe response, that fourth comprehensive signal quality of the switch-to AP is higher than a third specified threshold, the first wireless terminal accesses the switch-to AP.

In this solution, after determining that the first comprehensive signal quality of the first wireless terminal is lower than the first specified threshold, the first AP reduces the transmit power for sending the specified packets to the first wireless terminal, so that the first wireless terminal determines to re-probe an AP and sends a probe request after detecting that the second comprehensive signal quality of the first AP is lower than the second specified threshold. In addition, the first AP also sends the scan request to the other neighboring APs, so that the other APs actively scan the third comprehensive signal quality of the first wireless terminal and feed back the third comprehensive signal quality to the first AP. The first AP selects the switch-to AP for the first wireless terminal, and then notifies the switch-to AP to increase the transmit power for sending the probe response to the first wireless terminal. In this way, the first wireless terminal may determine that the fourth comprehensive signal quality of the switch-to AP is higher, and access the switch-to AP, thereby realizing fast roaming from the first AP to the switch-to AP and avoiding occurrence of a stickiness problem.

Specifically, the first sending module 31 is configured to detect that the first comprehensive signal quality of the first wireless terminal of the accessing wireless terminals is lower than the first specified threshold, and is specifically configured to:

monitor signal quality for packets from the accessing wireless terminals within a specified period;

calculate pieces of comprehensive signal quality of a corresponding wireless terminal based on the signal quality for the packets of the wireless terminals; and obtain, from the wireless terminals, a wireless terminal with comprehensive signal quality lower than the first specified threshold to obtain the first wireless terminal, and obtain comprehensive signal quality of the first wireless terminal to obtain the first comprehensive signal quality.

Specifically, when the specified packet is a null packet, the first sending module 31 is configured to reduce the transmit power by the first specified value and sending the specified packets to the first wireless terminal, and is specifically configured to:

construct a null packet to be sent to the first wireless terminal; and reduce the transmit power by the first specified value, and send the null packet to the first wireless terminal at a specified interval.

Specifically, the selection module 33 is configured to select the switch-to AP for the first wireless terminal from the neighboring APs based on the first comprehensive signal quality and the third comprehensive signal quality carried in the scan responses that carry the first identifier, and is specifically configured to:

obtain the third comprehensive signal quality carried in the scan responses that carry the first identifier;

respectively calculate differences between the obtained pieces of third comprehensive signal quality and the first comprehensive signal quality;

determine whether a largest difference of the differences exceeds a fourth specified threshold; and when it is determined that the largest difference exceeds the fourth specified threshold, determine an AP corresponding to the largest difference as the switch-to AP for the first wireless terminal.

In an embodiment, the apparatus further includes:

a fourth sending module, configured to send a response disabling notification carrying the first identifier to other APs of the neighboring APs other than the switch-to AP, so that each of the other APs are disabled from responding to the probe request when receiving the probe request.

Figure 4:
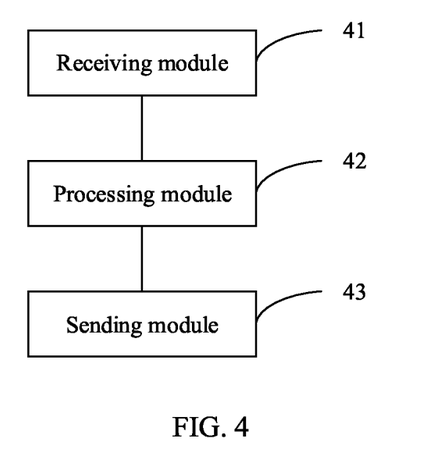
FIG. 4 is a schematic structural diagram of a roaming apparatus for a wireless terminal corresponding to FIG. 2 according to an embodiment of the present application.

Based on the same inventive concept, an embodiment of the present application provides a roaming apparatus for a wireless terminal. The apparatus corresponds to the method shown in FIG. 2, and is applied to a first neighboring AP of neighboring APs of a first AP. A structure of the apparatus is shown in FIG. 4, and the apparatus includes:

a receiving module 41, configured to receive a scan request that is sent by the first AP and that carries a first identifier of a first wireless terminal and a first channel accessed by the first wireless terminal, where the scan request is sent by the first AP to the neighboring APs when the first AP detects that first comprehensive signal quality of the first wireless terminal of accessing wireless terminals is lower than a first specified threshold, reduces a transmit power by a first specified value, and sends specified packets to the first wireless terminal, so that when determining, based on the specified packets, that second comprehensive signal quality of the first AP is lower than a second specified threshold, the first wireless terminal broadcasts a probe request;

a processing module 42, configured to: after switching to the first channel based on the scan request, determine third comprehensive signal quality of the first wireless terminal based on received packets that are sent by the first wireless terminal, and return a scan response carrying the first identifier and the third comprehensive signal quality to the first AP, so that the first AP selects a switch-to AP for the first wireless terminal from the neighboring APs based on the first comprehensive signal quality and third comprehensive signal quality carried in scan responses that carry the first identifier, and sends a transmit-power increasing notification carrying the first identifier and a second specified value to the switch-to AP; and a sending module 43, configured to: upon receiving the transmit-power increasing notification and the probe request sent by the first wireless terminal, determine that the probe request carries the first identifier, increase a transmit power by the second specified value, and send a probe response to the first wireless terminal, so that when determining, based on the probe response, that fourth comprehensive signal quality of the first neighboring AP is higher than a third specified threshold, the first wireless terminal accesses the first neighboring AP.

In this solution, after determining that the first comprehensive signal quality of the first wireless terminal is lower than the first specified threshold, the first AP reduces the transmit power for sending the specified packets to the first wireless terminal, so that the first wireless terminal determines to re-probe an AP and sends a probe request after detecting that the second comprehensive signal quality of the first AP is lower than the second specified threshold. In addition, the first AP also sends the scan request to the other neighboring APs, so that the other APs actively scan the third comprehensive signal quality of the first wireless terminal and feed back the third comprehensive signal quality to the first AP. The first AP selects the switch-to AP for the first wireless terminal, and then notifies the switch-to AP to increase the transmit power for sending the probe response to the first wireless terminal. In this way, the first wireless terminal may determine that the fourth comprehensive signal quality of the switch-to AP is higher, and access the switch-to AP, thereby realizing fast roaming from the first AP to the switch-to AP and avoiding occurrence of a stickiness problem.

Specifically, the processing module 42 is configured to determine the third comprehensive signal quality of the first wireless terminal based on the received packets that are sent by the first wireless terminal, and is specifically configured to:

obtain signal quality for the received packets that are sent by the first wireless terminal; and calculate the third comprehensive signal quality of the first wireless terminal based on the signal quality for the packets.

Figure 5:
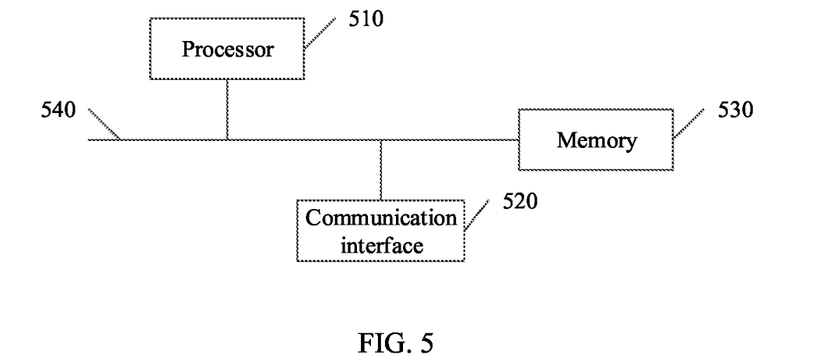
FIG. 5 is a schematic structural diagram of an electronic device according to this application.

An embodiment of this application further provides an electronic device. As shown in FIG. 5, the electronic device includes a processor 510, a communication interface 520, a memory 530, and a communication bus 540. The processor 510, the communication interface 520, and the memory 530 communicate with each other through the communication bus 540.

The memory 530 is configured to store a computer program.

The processor 510 is configured to implement the roaming method for a wireless terminal according to any one of the foregoing embodiments when executing the program stored in the memory 530.

The communication interface 520 is configured to support communication between the electronic device and another device.

The memory may include a random access memory (Random Access Memory, RAM), or may include a non-volatile memory (Non-Volatile Memory, NVM), for example, at least one magnetic disk memory. Optionally, the memory may alternatively be at least one storage apparatus located away from the processor.

The processor may be a general-purpose processor, including a central processing unit (Central Processing Unit, CPU), a network processor (Network Processor, NP), or the like; or may be a digital signal processor (Digital Signal Processor DSP), an application-specific integrated circuit (Application Specific Integrated Circuit, ASIC), a field programmable gate array (Field-Programmable Gate Array, FPGA) or another programmable logic device, a discrete gate or transistor logic device, or a discrete hardware component.

In this solution, after determining that first comprehensive signal quality of a first wireless terminal is lower than a first specified threshold, a first AP reduces a transmit power for sending specified packets to the first wireless terminal, so that the first wireless terminal determines to re-probe an AP and sends a probe request after detecting that second comprehensive signal quality of the first AP is lower than a second specified threshold. In addition, the first AP also sends a scan request to other neighboring APs, so that the other APs actively scan third comprehensive signal quality of the first wireless terminal and feed back the third comprehensive signal quality to the first AP. The first AP selects a switch-to AP for the first wireless terminal, and then notifies the switch-to AP to increase a transmit power for sending a probe response to the first wireless terminal. In this way, the first wireless terminal may determine that fourth comprehensive signal quality of the switch-to AP is higher, and accesses the switch-to AP, thereby realizing fast roaming from the first AP to the switch-to AP and avoiding occurrence of a stickiness problem.

Correspondingly, an embodiment of this application further provides a computer-readable storage medium. The computer-readable storage medium stores instructions. When the instructions run on a computer, the computer is enabled to perform the roaming method for a wireless terminal according to any one of the foregoing embodiments.

In this solution, after determining that first comprehensive signal quality of a first wireless terminal is lower than a first specified threshold, a first AP reduces a transmit power for sending specified packets to the first wireless terminal, so that the first wireless terminal determines to re-probe an AP and sends a probe request after detecting that second comprehensive signal quality of the first AP is lower than a second specified threshold. In addition, the first AP also sends a scan request to other neighboring APs, so that the other APs actively scan third comprehensive signal quality of the first wireless terminal and feed back the third comprehensive signal quality to the first AP. The first AP selects a switch-to AP for the first wireless terminal, and then notifies the switch-to AP to increase a transmit power for sending a probe response to the first wireless terminal. In this way, the first wireless terminal may determine that fourth comprehensive signal quality of the switch-to AP is higher, and access the switch-to AP, thereby realizing fast roaming from the first AP to the switch-to AP and avoiding occurrence of a stickiness problem.

The present application is described with reference to the flowcharts and/or block diagrams of the method, the device (system), and the computer program product based on the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Alternatively, these computer program instructions may be stored in a computer-readable memory capable of instructing a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the other programmable device provide steps for implementing a specific function in one or more processes in the flowcharts and/or in one or more blocks in the block diagrams.

Although optional embodiments of this application have been described, persons skilled in the art may make additional changes and modifications to these embodiments once they learn the basic inventive concept. Therefore, the appended claims shall be construed to cover the optional embodiments and all changes and modifications falling within the scope of the present application.

Clearly, persons skilled in the art may make various modifications and variations to the embodiments of the present application without departing from the spirit and scope of the embodiments of the present application. Therefore, the present application is intended to cover the changes and variations provided that the changes and variations of the embodiments of the present application fall within the scope of the claims of the present application or equivalent technologies thereof.

What is claimed is:

1. A roaming method for a wireless terminal, applied to a first access point (AP) of APs, and comprising:
   detecting that first comprehensive signal quality of a first wireless terminal of accessing wireless terminals is lower than a first specified threshold, reducing a transmit power by a first specified value, and sending specified packets to the first wireless terminal, wherein the specified packets are null packets, so that when determining, based on the specified packets, that second comprehensive signal quality of the first AP is lower than a second specified threshold, the first wireless terminal broadcasts a probe request carrying a first identifier of the first wireless terminal;
   sending, to neighboring APs, a scan request carrying the first identifier and a first channel accessed by the first wireless terminal, so that each of the neighboring APs switches to the first channel based on the scan request, determines third comprehensive signal quality of the first wireless terminal based on received packets that are sent by the first wireless terminal, and returns a scan response carrying the first identifier and the third comprehensive signal quality;
   selecting a switch-to AP for the first wireless terminal from the neighboring APs based on the first comprehensive signal quality and pieces of third comprehensive signal quality carried in scan responses that carry the first identifier; and
   sending a transmit-power increasing notification carrying the first identifier and a second specified value to the switch-to AP, so that the switch-to AP, when determining that the probe request carries the first identifier, increases a transmit power by the second specified value and sends a probe response to the first wireless terminal, and the first wireless terminal, when determining, based on the probe response, that fourth comprehensive signal quality of the switch-to AP is higher than a third specified threshold, accesses the switch-to AP.

2. The method according to claim 1, wherein the detecting that the first comprehensive signal quality of the first wireless terminal of the accessing wireless terminals is lower than the first specified threshold, comprises:
   monitoring signal quality for packets from the accessing wireless terminals within a specified period;
   calculating a piece of comprehensive signal quality of a corresponding wireless terminal based on the signal quality for the packets from the wireless terminals; and
   obtaining, from the accessing wireless terminals, a wireless terminal with comprehensive signal quality lower than the first specified threshold as the first wireless terminal, and obtaining comprehensive signal quality of the first wireless terminal as the first comprehensive signal quality.

3. The method according to claim 2, wherein a packet of the packets from the accessing wireless terminals is a packet for normal communication with the first AP.

4. The method according to claim 3, wherein the packet for the normal communication with the first AP is a service packet or a management packet.

5. The method according to claim 2, wherein a piece of signal quality of the signal quality for the packets of the wireless terminals is a received signal strength indicator (RSSI) or a signal to noise ratio (SNR).

6. The method according to claim 2, wherein the calculating the comprehensive signal quality of the corresponding wireless terminal based on the signal quality for the packets from the wireless terminals, comprises:
   calculating the comprehensive signal quality of the corresponding wireless terminal based on the signal quality for the packets from the wireless terminals by a calculation of a mean or a variance.

7. The method according to claim 1, wherein the first specified value is in inverse proportional to the first specified threshold.

8. The method according to claim 1, wherein the reducing the transmit power by the first specified value, and sending the specified packets to the first wireless terminal, comprises:
constructing the null packets to be sent to the first wireless terminal; and
reducing the transmit power by the first specified value, and sending the null packets to the first wireless terminal at a specified interval.

9. The method according to claim 1, wherein the selecting the switch-to AP for the first wireless terminal from the neighboring APs based on the first comprehensive signal quality and the pieces of third comprehensive signal quality carried in the scan responses that carry the first identifier, comprises:
obtaining the pieces of third comprehensive signal quality carried in the scan responses that carry the first identifier;
calculating differences between each of the obtained pieces of third comprehensive signal quality and the first comprehensive signal quality, respectively;
determining whether a largest difference of the differences exceeds a fourth specified threshold; and
determining, when determining that the largest difference exceeds the fourth specified threshold, an AP corresponding to the largest difference as the switch-to AP for the first wireless terminal.

10. The method according to claim 1, further comprising:
sending a response disabling notification carrying the first identifier to other APs of the neighboring APs other than the switch-to AP, so that each of the other APs is disabled from responding to the probe request when receiving the probe request.

11. A roaming method for a wireless terminal, applied to a first neighboring access point (AP) from neighboring APs for a first AP, and comprising:
receiving a scan request that is sent by the first AP and that carries a first identifier of a first wireless terminal and a first channel accessed by the first wireless terminal, wherein the scan request is sent by the first AP to the neighboring APs when the first AP detects that first comprehensive signal quality of the first wireless terminal of accessing wireless terminals is lower than a first specified threshold, reduces a transmit power by a first specified value, and sends specified packets to the first wireless terminal, wherein the specified packets are null packets, so that when determining, based on the specified packets, that second comprehensive signal quality of the first AP is lower than a second specified threshold, the first wireless terminal broadcasts a probe request;
after switching to the first channel based on the scan request, determining third comprehensive signal quality of the first wireless terminal based on received packets that are sent by the first wireless terminal, and returning a scan response carrying the first identifier and the third comprehensive signal quality to the first AP, so that the first AP selects a switch-to AP for the first wireless terminal from the neighboring APs based on the first comprehensive signal quality and third comprehensive signal quality carried in scan responses that carry the first identifier, and sends a transmit-power increasing notification carrying the first identifier and a second specified value to the switch-to AP; and
upon receiving the transmit-power increasing notification and the probe request sent by the first wireless terminal, determining that the probe request carries the first identifier, increasing a transmit power by the second specified value, and sending a probe response to the first wireless terminal, so that when determining, based on the probe response, that fourth comprehensive signal quality of the first neighboring AP is higher than a third specified threshold, the first wireless terminal accesses the first neighboring AP.

12. The method according to claim 11, wherein the determining third comprehensive signal quality of the first wireless terminal based on the received packets that are sent by the first wireless terminal, comprises:
obtaining pieces of signal quality for the received packets that are sent by the first wireless terminal; and
calculating the third comprehensive signal quality for the first wireless terminal based on the pieces of signal quality for the packets.

13. The method according to claim 12, wherein a received packet of the received packets is a packet for normal communication with the first AP.

14. The method according to claim 13, wherein the packet for the normal communication with the first AP is a service packet or a management packet.

15. The method according to claim 12, wherein a piece of signal quality of signal quality for the received packet is a received signal strength indicator (RSSI) or a signal to noise ratio (SNR).

16. The method according to claim 12, wherein the calculating the third comprehensive signal quality for the first wireless terminal based on the pieces of signal quality for the packets, comprises:
calculating the third comprehensive signal quality for the first wireless terminal based on the pieces of signal quality for the packets by a calculation of a mean or a variance.

17. The method according to claim 11, wherein the first specified value is in inverse proportional to the first specified threshold.

18. An electronic device, wherein the electronic device comprises a processor, a communication interface, a memory, and a communication bus, and the processor, the communication interface, and the memory communicate with each other through the communication bus;
the memory is configured to store a computer program; and
the processor is configured to perform:
detecting that first comprehensive signal quality of a first wireless terminal of accessing wireless terminals is lower than a first specified threshold, reducing a transmit power by a first specified value, and sending specified packets to the first wireless terminal, wherein the specified packets are null packets, so that when determining, based on the specified packets, that second comprehensive signal quality of the first AP is lower than a second specified threshold, the first wireless terminal broadcasts a probe request carrying a first identifier of the first wireless terminal;
sending, to neighboring APs, a scan request carrying the first identifier and a first channel accessed by the first wireless terminal, so that each of the neighboring APs switches to the first channel based on the scan request, determines third comprehensive signal quality of the first wireless terminal based on received packets that are sent by the first wireless terminal, and returns a scan response carrying the first identifier and the third comprehensive signal quality;
selecting a switch-to AP for the first wireless terminal from the neighboring APs based on the first comprehensive signal quality and pieces of third comprehensive signal quality carried in scan responses that carry the first identifier; and sending a transmit-power increasing notification carrying the first identifier and a second specified value to the switch-to AP, so that the switch-to AP, when determining that the probe request carries the first identifier, increases a transmit power by the second specified value and sends a probe response to the first wireless terminal, and the first wireless terminal, when determining, based on the probe response, that fourth comprehensive signal quality of the switch-to AP is higher than a third specified threshold, accesses the switch-to AP.

* * * * *